Aug. 9, 1938.　　　　P. W. NIPPERT　　　　2,126,342
GENERATOR TESTING MACHINE
Filed April 27, 1936　　　　3 Sheets-Sheet 1

Inventor
Paul W. Nippert
By
W. S. McHowell
Attorney

Aug. 9, 1938. P. W. NIPPERT 2,126,342
GENERATOR TESTING MACHINE
Filed April 27, 1936 3 Sheets-Sheet 2
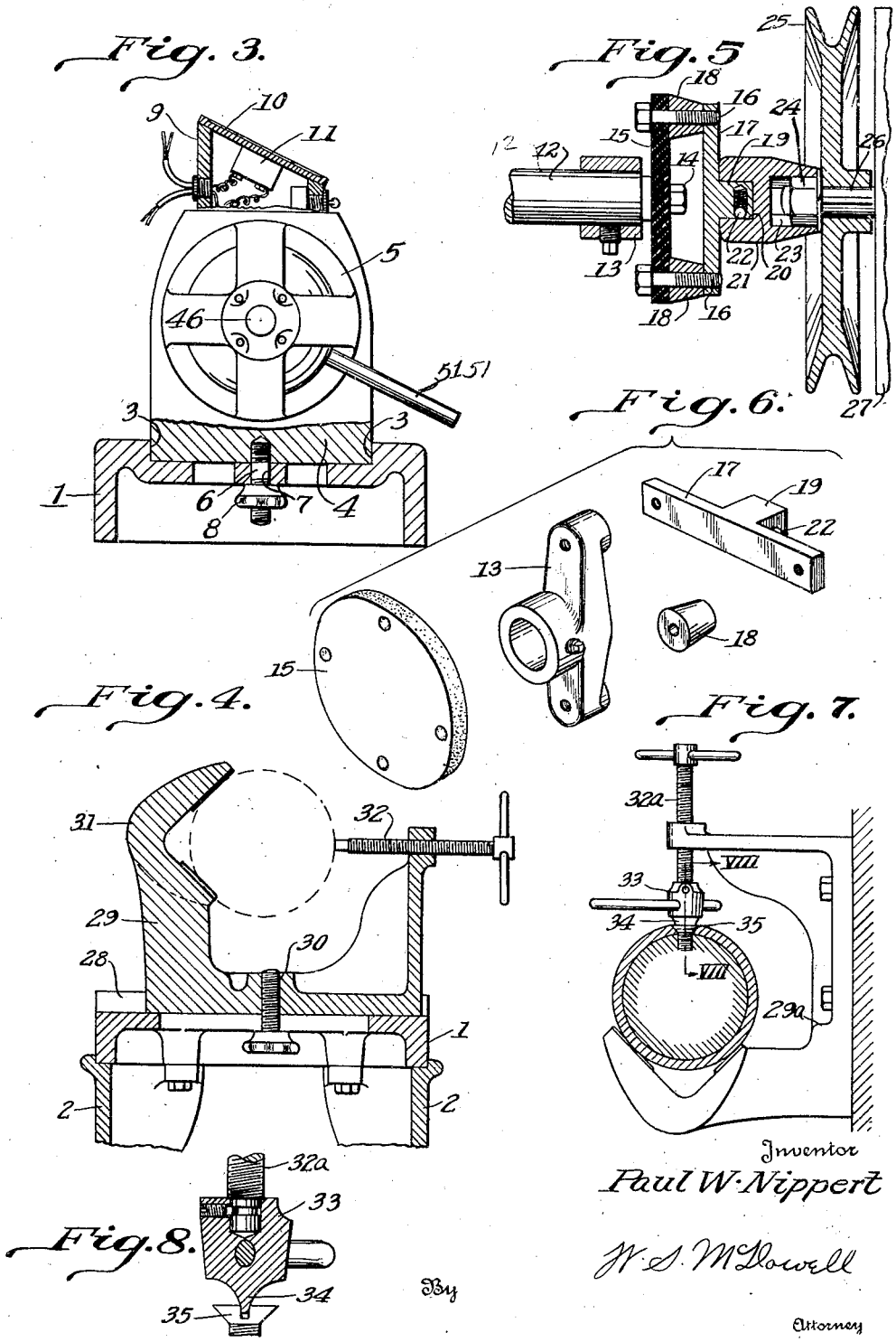

Aug. 9, 1938.  P. W. NIPPERT  2,126,342
GENERATOR TESTING MACHINE
Filed April 27, 1936   3 Sheets-Sheet 3
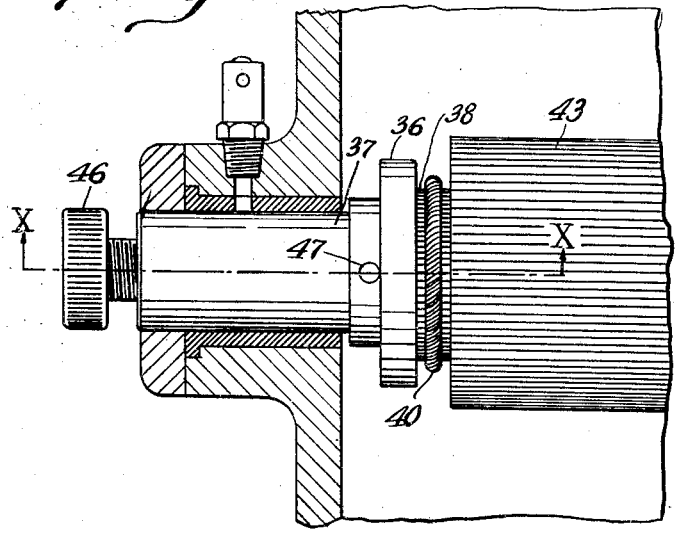
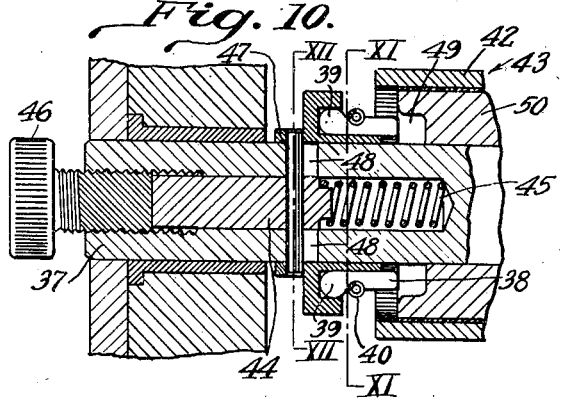
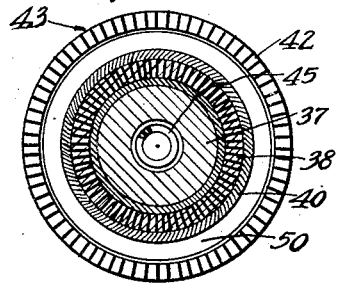
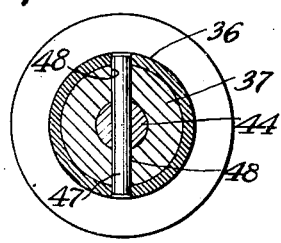
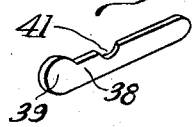
Inventor
Paul W. Nippert
By  W. S. McDowell
Attorney Patented Aug. 9, 1938

2,126,342

UNITED STATES PATENT OFFICE 2,126,342

GENERATOR TESTING MACHINE

Paul W. Nippert, Columbus, Ohio

Application April 27, 1936, Serial No. 76,643

3 Claims. (Cl. 73—51)

This invention relates to an improved machine for testing generators, particularly generators of the type employed in connection with the electrical systems of motor vehicles. Such generators frequently have to be repaired, rewired or rebuilt and following such restorations, it is a common procedure to connect the same with an electric motor so that the current output of the generator may be noted, thus enabling the electrician to readily determine when the repaired or restored generator is again in efficient working order.

It is an object of the present invention to provide a simple, readily adjustable and adaptable machine for effecting these determinations, and wherein provision is made for readily coupling and aligning the shaft of the driving motor with that of the generator and to compensate for slight inequalities in alignment, if such exist.

It is another object of the invention to provide improved means for effecting the support of generators within the testing machine, and wherein the supporting means are adjustable to admit of the secure reception of generators having frames or casings of varying diameter, to provide for the quick insertion, securing and removal of a generator into and from the supporting means and to provide for the adjustment of the supporting means and the generator carried thereby bodily and transversely of the machine bed.

A further object resides in the provision of an improved flexible drive coupling carried by the armature shaft of the motor, and wherein one end of the coupling is formed with a readily detachable member having a longitudinally disposed open ended socket formed therein and adapted for the reception of the shaft securing nut of a generator, a set of said socketed members being preferably employed in order to adapt the coupling to generator shaft nuts of varying sizes.

A still further object of the invention resides in providing the case of the driving motor on the top thereof with a panel, the latter containing recording instruments for denoting current characteristics of the electrical current developed by the operation of the generator when driven by the motor.

Still, a further object of the invention resides in mounting the driving motor for longitudinal adjustment on the supporting bed of the machine and for readily maintaining the motor in its various positions of longitudinal adjustment, whereby to adapt the apparatus to generators of varying length or to the positions which the generator may occupy when supported within the machine.

For a further understanding of the invention, reference is to be had to the following description and the accompanying drawings, wherein:

Fig. 3 is a vertical transverse sectional view taken through the driving motor and its instrument panel on the plane indicated by the line III—III of Fig. 1, and showing the means for retaining the motor in its various positions of longitudinal adjustment on the supporting bed of the machine;

Fig. 4 is a vertical transverse sectional view taken through the generator supporting clamp on the plane indicated by the line IV—IV of Fig. 1;

Fig. 5 is a horizontal sectional view on the line V—V of Fig. 1 and disclosing more particularly the construction of the flexible drive coupling and the detachable socket member;

Fig. 6 is a group view showing in perspective the several elements entering into the construction of the flexible coupling;

Fig. 7 is a view of a modified form of generator clamp, wherein the securing screw of the clamp is provided with a swiveled head for facilitating the operation of removing or inserting generator screws or pole shoe screws;

Fig. 8 is an enlarged vertical sectional view on the line VIII—VIII of Fig. 7;

Fig. 9 is a vertical longitudinal sectional view taken through commutator end of the motor and shows in side elevation an adjustable cutout device used therewith;

Fig. 10 is a similar view on the plane indicated by the line X—X of Fig. 9;

Fig. 11 is a detail vertical sectional view on the plane indicated by the line XI—XI of Fig. 10;

Fig. 12 is a similar view on the plane indicated by the line XII—XII of Fig. 10;

Fig. 13 is a perspective view of a pawl member used in the cutout device.

Figure 1:
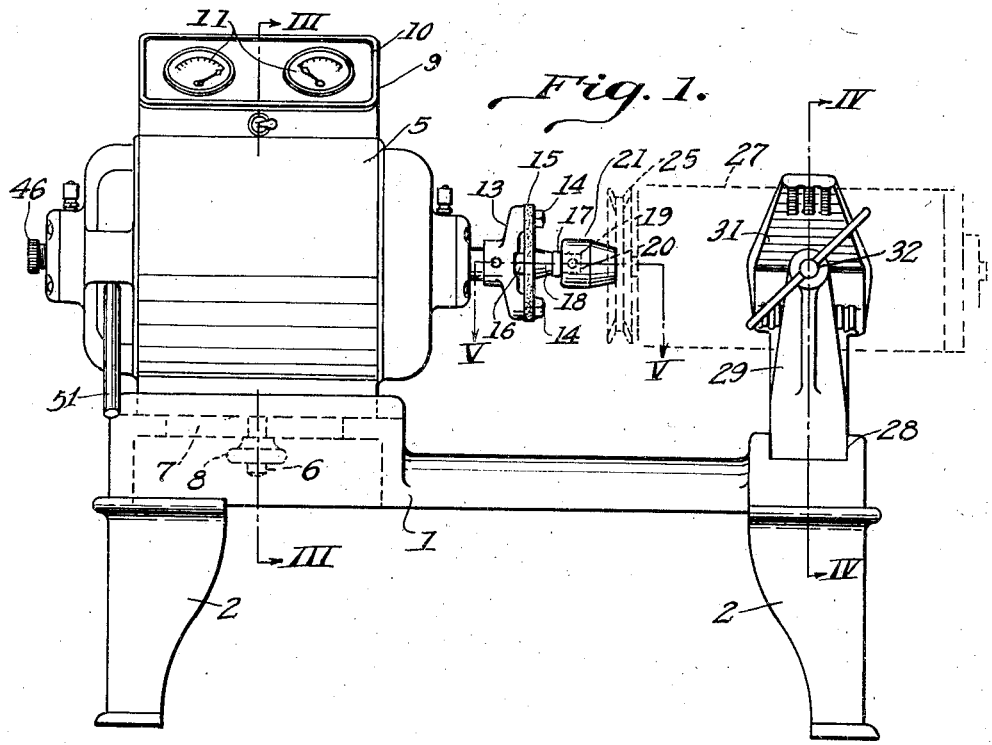
Fig. 1 is a view in side elevation of the generator testing machine comprising the present invention. In this figure, the generator to be tested is disclosed by dotted lines.
Figure 2:
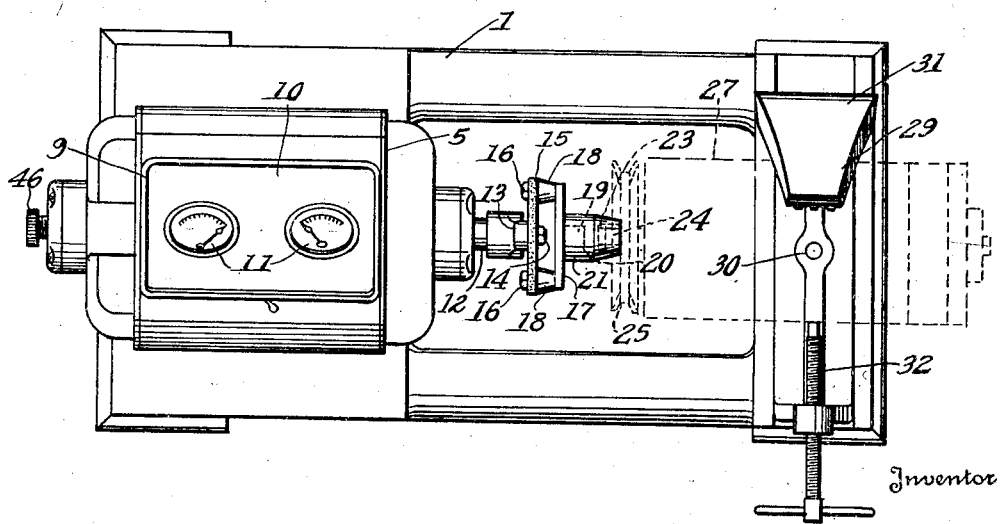
Fig. 2 is a top plan view of the testing machine.

Referring more particularly to the drawings, the numeral 1 designates the cast metal supporting bed of the improved generator testing machine comprising the present invention. The four corners of the bed are preferably provided with depending legs 2 by means of which the main horizontal portion of the bed will be retained at a desired level, although it is within the scope of the invention to eliminate the legs 2 and directly mount the supporting bed on a bench, stand or other form of support.

As shown in Fig. 3, the bed 1 is provided with longitudinally extending channeled guides 3 in which are received and supported the frame 4 of an electric motor 5. This motor may be of any suitable commercial type but in this instance the lower part of the frame thereof is equipped with a stationary depending screw 6 which is slidable in a longitudinal slot 7 formed in the bed 1. The lower part of the screw 6 carries a hand nut 8 which upon being tightened, engages with the under side of the bed 1, to securely retain the motor in its longitudinal positions of adjustment.

Also, in the present invention, the upper portion of the motor frame 4 is flattened and has mounted thereon a casing 9 formed with an angularly sloping top wall 10. Carried by the top wall 10 and extending into the casing are instruments 11, such as voltmeters or ammeters, employed for denoting the current characteristics of the output current of a generator undergoing testing.

Fixed to the outer end of the armature shaft 12 of the motor is a yoke 13 of a flexible drive coupling. The outer ends of the transversely extending bar of the yoke 13 are provided with threaded openings for the reception of threaded bolts 14 which unite the yoke 13 with the circumferential portion of a relatively flexible composition disk 15. Spaced 90 degrees from the points of connection of the disk 15 with the yoke 13 are openings in said disk through which pass threaded bolts 16 which connect the disk with a T member 17, the latter being separated from the adjacent surface of the disk by means of spacer elements 18 which surround the bolts 16. In longitudinal alignment with the shaft 12, the T member 17 is formed with a squared shank 19 which is formed to be positioned within a correspondingly shaped socket 20 provided in a detachable socket member 21. The latter is conveniently retained in connection with the shank 19 by providing the said shank with a transverse bore in which is positioned a spring pressed ball 22, which frictionally engages a depression in one of the walls of the socket 20 to retain said socket member in place and free from the possibility of accidental removal. The opposite longitudinal end of the member 21 is also provided with an open ended, polygonal, longitudinally extending socket 23, formed for the reception of a nut 24, provided in connection with most standard generators for retaining its drive or pulley wheel 25 on the shaft 26 of the generator 27. Inasmuch as the sizes of the nuts 24 vary, the socket member 21 is made readily detachable, and is preferably one of a set, so that the coupling may be readily adapted to practically all types and styles of generators adapted for automotive use.

In order to hold the generator conveniently, securely and detachably in connection with the machine and with its shaft in substantial alignment with the motor shaft, the bed 1 is provided, adjacent to one end thereof, with a transversely extending channeled guide 28. Mounted in this guide for adjustment transversely of the machine bed is a generator supporting clamp or vice 29. The bottom of the clamp is provided with a threaded opening for the reception of a hand-manipulated screw 30 which, when tightened, serves to hold the said clamp or vice in its positions of adjustment within the guide 28. The clamp or vice includes a substantially V-shaped jaw 31 having opposed angular surfaces which are so arranged as to receive the circular casings of automotive generators, even though they may vary somewhat in diameter. The generator casings are held securely against the jaws 31 by providing the vice or clamp with a hand manipulated tightening screw 32, the inner end of the latter engaging with one side of a generator casing, as shown in Fig. 4, to force the latter into securely held engagement with the surfaces of the jaw 31. By the provision of the transverse adjustment of the jaw or clamp bodily over the bed frame of the machine, convenience is to be had in the matter of aligning the shaft of the generator with that of the driving motor. When the securing nut 24 of the generator is positioned within the socket 23 of the member 21, the operation of the motor will result in driving the generator. The output leads of the generator are extended to the instruments 11 so that the efficiency and current characteristics of the generator being tested may be readily ascertained.

In Figs. 7 and 8, the vice 29a is provided with a screw 32a to the inner end of which is swiveled a head 33 provided with a screw driver point 34. The head 33 being swiveled on the end of the screw 32a may be turned independently thereof for the purpose of effecting the tightening or removal of securing pole-shoe screws 35 with respect to a generator frame.

The driving motor 5 is preferably of the repulsion-induction type and, as usual with this type of motor, an automatically actuated changeover device is employed to convert the motor from a variable speed motor to a constant speed motor when a certain R. P. M. is attained. The speed at which this conversion is usually set to take place in motors of this character is about 1800 R. P. M. At times, it is desirable, in operating the tester forming the present invention, to have the generator undergoing test rotate at a higher speed than the constant speed to which the driving motor is set. To accomplish this, the motor illustrated in the drawings is provided with means for adjusting the cutout or change-over device so that it will be held against operation and will permit higher speeds than the usually constant speed to be attained.

The adjustable cutout device has been shown in Figs. 9 to 12 inclusive and includes a ring 36 which is slidably carried by the armature shaft 37 of the motor 5. A multiplicity of pawl members 38 have their enlarged ends 39 received within an annular open-ended recess formed in the ring 36 and when the shaft rotates, centrifugal force will cause the smaller ends of the members 38 to swing outwardly. To control this outward swing, an endless coil spring 40 is positioned within a notch 41 cut in the outer edge of each of the pawl members 38. This spring possesses sufficient strength to prevent outward swing of the ends of the members 38 until the predetermined constant speed is reached when the pawls will have sufficient force to overcome the spring and swing out to engage the inner side of the segments 42 forming the commutator 43. The engagement of the pawls with the segments will cause the latter to be short circuited, converting the motor from a repulsion type to an induction type.

To prevent this change, the end of the shaft 37 is provided with a bore in which is slidably received a short rod 44. A spring 45 is positioned between the inner end of the rod and the bore and tends to force the former toward the open end of the bore. A thumb screw 46 is threaded into the open end of the bore and acts to move the rod 44 in opposition to the spring. Near its inner end, the rod 44 is provided with a transverse pin 47 which passes through slots 48 in the shaft and engages the ring 36 so that when the thumb screw 46 is adjusted, the ring and the pawls carried thereby may be moved longitudinally of the shaft. By turning the screw inward, the ends of the pawls may be positioned in the annular recess 49 formed in the commutator core 50 and their outward swinging movement restricted. This will prevent their short circuiting the commutator segments and higher speeds of rotation may be attained. When it is desired to return the motor to its original form, the thumb screw may be backed out and the ring and pawls will be moved out so that the latter will again engage the segments when the proper speed of rotation is attained.

The motor 5 is provided adjacent one end with a bar-like extension 51 which may be grasped by the operator when it is desired to move the motor in the guide channel 3.

In view of the foregoing, it will be seen that the present invention provides an adaptable and conveniently actuated machine for testing repaired generators, or for other analogous uses. The machine is very simple to use inasmuch as the relative longitudinal adjustment of the motor 5 and the transverse adjustment of the vice or clamp 29, permits a generator and its shaft to be readily aligned with the flexible coupling carried by the motor shaft. If there should be any inequalities in this alignment, the same can be readily compensated for through the actuation of the flexible disk 15 of the coupling. The device enables repaired generators of various makes or sizes to be tested rapidly and in successive order so that but a minimum of time will be lost in adapting the machine to one make of generator or to another.

What is claimed is:

1. In apparatus for testing motor vehicle generators, a bed, an electric motor mounted on said bed, said motor being provided with a drive shaft, a generator support positioned on said bed in longitudinally spaced relation from said motor, said support being formed with an upstanding member provided with an inwardly facing substantially V-shaped jaw for the reception of circular generator housings of varying diameter, clamping means carried by the opposite side of said support with respect to said upstanding member to positively maintain a generator housing in a seated and supported position in contact with the jaw surfaces of said member, whereby to maintain the shaft of a generator so supported in the horizontal plane of the drive shaft for said motor irrespective of variations in the diameter of the housings of such generators, means for effecting transverse adjustment of the support relative to said bed to effect longitudinal alignment of the shaft of a generator carried by said support with the drive shaft of said motor, and detachable coupling means directly uniting the so aligned motor and generator shafts.

2. In apparatus for testing motor vehicle generators, a bed frame provided with longitudinally and transversely extending guides, an electric motor adjustably supported in the longitudinal guide of said frame, the driving shaft of said motor extending longitudinally of the frame, a generator supporting vise slidably received by the transversely extending guide, said vise including a V-shaped jaw disposed at one side with the open portion thereof facing toward the center of the machine, the center of said V-shaped jaw being in the same horizontal plane as the driving shaft of said motor, a clamping screw on said vise positioned substantially in registration with the horizontal center of said jaw, a coupling member secured to the inner end of the driving shaft of said motor, and manually actuated means for clamping said motor and said generator vise in positions of adjustment in said guides.

3. In apparatus for testing motor vehicle generators, a bed frame provided with guides extending at right angles to one another, an electric motor adjustably supported in one of said guides, the driving shaft of said motor extending longitudinally of the guide in which the motor is positioned, a generator holding vise adjustably received by the other guide, said vise including a V-shaped jaw disposed at one side with the open portion thereof facing toward the center of the machine, the center of said V-shaped jaw being in the same horizontal plane as the driving shaft of said motor, a clamping screw on said vise positioned substantially in registration with the horizontal center of said jaw, a flexible coupling member secured to the inner end of the driving shaft of said motor, a socketed member carried by said coupling, and manually actuated devices for securing said motor and said generator vise in adjusted positions in said guides.

PAUL W. NIPPERT.